United States Patent
Takahashi

(10) Patent No.: US 12,045,088 B2
(45) Date of Patent: Jul. 23, 2024

(54) THIN PORTABLE COMMUNICATION TERMINAL, AND CONTROL METHOD AND CONTROL PROGRAM THEREOF

(71) Applicant: ROBO GARAGE Co., LTD., Otsu (JP)

(72) Inventor: Tomotaka Takahashi, Otsu (JP)

(73) Assignee: Robo Garage Co., Ltd., Otsu (JP)

(*) Notice: Subject to any disclaimer, the term of this patent is extended or adjusted under 35 U.S.C. 154(b) by 350 days.

(21) Appl. No.: 17/550,101

(22) Filed: Dec. 14, 2021

(65) Prior Publication Data
US 2022/0100230 A1   Mar. 31, 2022

Related U.S. Application Data

(63) Continuation of application No. PCT/JP2019/023711, filed on Jun. 14, 2019.

(51) Int. Cl.
*G06F 1/16* (2006.01)
*G06F 1/18* (2006.01)
*H04M 1/02* (2006.01)

(52) U.S. Cl.
CPC ............ *G06F 1/1616* (2013.01); *G06F 1/181* (2013.01); *H04M 1/0216* (2013.01); *H04M 1/0225* (2013.01)

(58) Field of Classification Search
CPC .... G06F 1/1601; G06F 1/1615; G06F 1/1626; G06F 1/1633; G06F 1/166; G06F 1/1675; G06F 1/1681; G06F 2200/1631; G06F 2200/1637; A63H 13/00; A63H 2200/00
See application file for complete search history.

(56) References Cited

U.S. PATENT DOCUMENTS

| | | | | |
|---|---|---|---|---|
| 8,457,696 | B2* | 6/2013 | Pegg | H04M 1/0216 455/90.3 |
| 9,013,865 | B2* | 4/2015 | Chen | F16M 13/005 361/679.21 |
| 10,807,246 | B2* | 10/2020 | Hong | B62D 57/032 |
| 11,407,120 | B2* | 8/2022 | Sakamoto | B62D 57/032 |

(Continued)

FOREIGN PATENT DOCUMENTS

| | | |
|---|---|---|
| CN | 105007417 A | 10/2015 |
| JP | 2005-103703 | 4/2005 |

(Continued)

OTHER PUBLICATIONS

Notification of Reasons for Refusal dated Jan. 10, 2023, of counterpart Japanese Patent Application No. 2021-525881, along with an English translation.

(Continued)

*Primary Examiner* — Anthony Q Edwards
(74) *Attorney, Agent, or Firm* — DLA Piper LLP (US)

(57) ABSTRACT

A thin portable communication terminal that includes a casing having a rectangular parallelepiped shape; one pair of arm portions each having one end that is axially supported to be turnable with respect to corresponding one of both side faces on longer sides of the casing; hand portions each disposed at another end of corresponding one of the one pair of arm portions; and a leg portion disposed on one side face that is on a shorter side of the casing and is capable of independent movement.

19 Claims, 18 Drawing Sheets

(56) References Cited

U.S. PATENT DOCUMENTS

| | | | | |
|---|---|---|---|---|
| 2004/0036437 | A1* | 2/2004 | Ito | G06N 3/008 |
| | | | | 180/8.6 |
| 2007/0249396 | A1* | 10/2007 | Nitta | H04M 1/0272 |
| | | | | 348/744 |
| 2009/0209284 | A1* | 8/2009 | Kim | H04M 1/72454 |
| | | | | 901/1 |
| 2009/0261216 | A1* | 10/2009 | Yang | H04M 1/04 |
| | | | | 345/173 |
| 2012/0290111 | A1* | 11/2012 | Badavne | G06N 3/008 |
| | | | | 901/1 |
| 2013/0320173 | A1* | 12/2013 | Lin | A47B 23/042 |
| | | | | 248/309.1 |
| 2017/0157482 | A1* | 6/2017 | DeCarlo | A63B 63/083 |
| 2017/0162088 | A1* | 6/2017 | Kasuga | A63H 13/02 |
| 2017/0296935 | A1* | 10/2017 | Motomura | H04M 1/02 |
| 2018/0131856 | A1 | 5/2018 | Sato et al. | |
| 2018/0186002 | A1* | 7/2018 | Inoue | B25J 9/0087 |
| 2019/0158340 | A1* | 5/2019 | Zhang | H04B 17/318 |
| 2019/0232485 | A1* | 8/2019 | Reese | B25J 17/00 |
| 2019/0325865 | A1* | 10/2019 | Oktem | G10L 15/22 |
| 2019/0369641 | A1* | 12/2019 | Gillett | B62D 57/028 |
| 2020/0290198 | A1* | 9/2020 | Yanase | A63F 13/58 |
| 2021/0387346 | A1* | 12/2021 | Gillett | B25J 19/0075 |

FOREIGN PATENT DOCUMENTS

| | | |
|---|---|---|
| JP | 2006-262426 | 9/2006 |
| JP | 2007-27936 | 2/2007 |
| JP | 2009-177761 | 8/2009 |
| JP | 2012-29066 | 2/2012 |
| JP | 2013-038752 | 2/2013 |
| JP | 2013-042476 W | 2/2013 |
| JP | 2016-036899 | 3/2016 |
| JP | 2017-152913 | 8/2017 |
| JP | 2018-078371 A | 5/2018 |
| KR | 10-2017-142088 A | 12/2017 |

OTHER PUBLICATIONS

Notice of Preliminary Rejection dated Apr. 8, 2023, of counterpart Korean Patent Application No. 10-2022-7001306, along with an English translation.

Extended European Search Report dated Dec. 14, 2022, of counterpart European Patent Application No. 19932861.8.

Notice of Preliminary Rejection dated Oct. 24, 2023, of counterpart Korean Patent Application No. 10-2022-7001306, along with an English translation.

International Search Report dated Sep. 10, 2019, in counterpart International Application No. PCT/JP2019/023711 w/ English translation.

RoBoHON, http://robohon.com, Jun. 5, 2019 w/English translation.

* cited by examiner

FIG. 1A
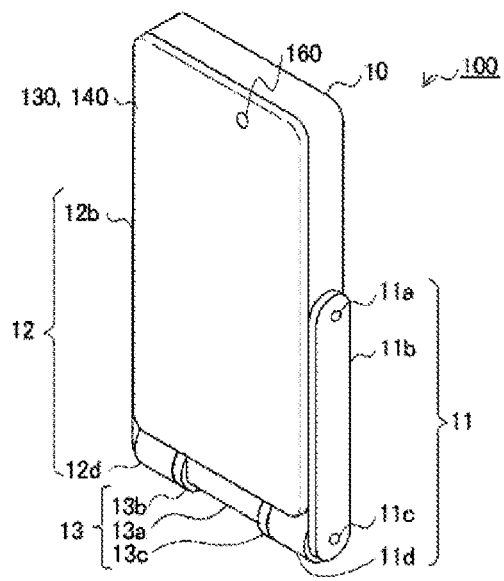
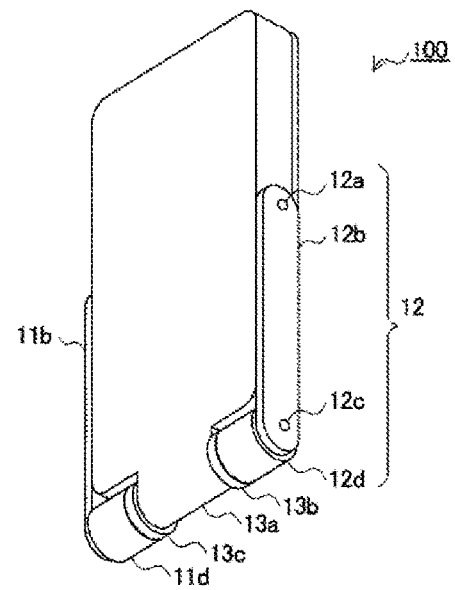
FIG. 1B

FIG. 5

| USER ID | IMAGE FILE | EYES | NOSE | MOUTH | OUTLINE |
|---|---|---|---|---|---|
| 0001 | User0001.jpg | Eye0001 | Nose0001 | Mouth0001 | Outline0001 |
| 0002 | User0002.jpg | Eye0002 | Nose0002 | Mouth0002 | Outline0002 |
| 0003 | User0003.jpg | Eye0003 | Nose0003 | Mouth0003 | Outline0003 |
| 0004 | User0004.jpg | Eye0004 | Nose0004 | Mouth0004 | Outline0004 |

FIG. 6

| CHARACTER | ACCUMULATED USAGE TIME | SCREEN DISPLAY | MOVING PORTION CONTROL | ARM PORTION CONTROL |
|---|---|---|---|---|
| MONKEY | UP TO 100 MINUTES | Character0001-01.png | PatternA0001 | PatternB0001 |
| | 101 TO 200 MINUTES | Character0001-02.png | PatternA0002 | PatternB0002 |
| | 201 MINUTES OR MORE | Character0001-03.png | PatternA0003 | PatternB0003 |
| FEMALE CHILD | UP TO 100 MINUTES | Character0002-01.png | PatternA0001 | PatternB0001 |
| | 101 TO 200 MINUTES | Character0002-02.png | PatternA0002 | PatternB0002 |
| | 201 MINUTES OR MORE | Character0002-03.png | PatternA0002 | PatternB0003 |
| SUPER CAR | UP TO 100 MINUTES | Character0003-01.png | PatternA0001 | PatternB0001 |
| | 101 TO 200 MINUTES | Character0003-02.png | PatternA0002 | PatternB0001 |
| | 201 MINUTES OR MORE | Character0003-03.png | PatternA0003 | PatternB0001 |

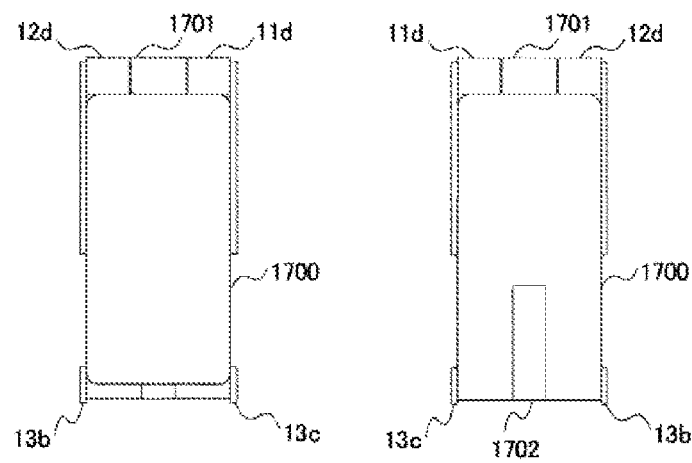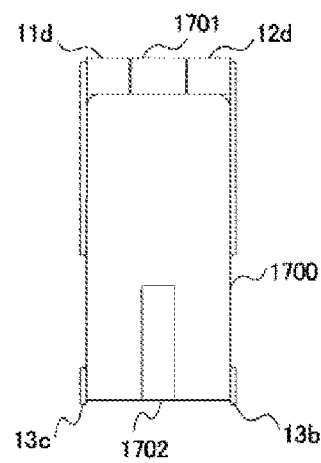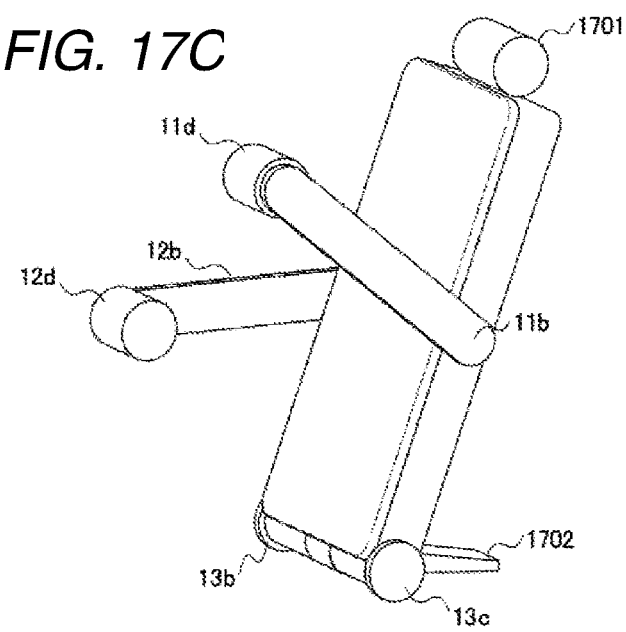

THIN PORTABLE COMMUNICATION TERMINAL, AND CONTROL METHOD AND CONTROL PROGRAM THEREOF

TECHNICAL FIELD

This disclosure relates to a thin portable communication terminal also capable of operating as a robot, and a control method and a control program thereof.

BACKGROUND

Various ideas that allow portable phones, which have become familiar items for users conventionally, to implement characters such that the users can feel more familiar with the portable phones have been devised in recent years. For example, Japanese Unexamined Patent Application Publication No. 2012-29066 discloses that the shape of a portable phone is formed as a figure. In addition, for example, in Japanese Unexamined Patent Application Publication No. 2007-27936, an idea that allows a portable phone to implement a character by displaying an expression on the screen of the portable phone is devised. In contrast, as disclosed in RoBoHoN, URL: https://robohon.com/ (retrieved Jun. 5, 2019), a product configuring a robot having an appropriate size, which can be carried by a user, to have a communication function has been developed as well.

However, in Japanese Unexamined Patent Application Publication No. 2012-29066, the hands and feet of the object imitating the figure do not move. In addition, in Japanese Unexamined Patent Application Publication No. 2007-27936, no hands and feet are provided and only expressions are displayed on the screen. For this reason, in Japanese Unexamined Patent Application Publication No. 2012-29066 and Japanese Unexamined Patent Application Publication No. 2007-27936, the power of expression as a character is insufficient, and there is a problem in that there is a limitation on possible expressions when viewed as a robot. In contrast, in the robot disclosed in RoBoHoN, URL: https://robohon.com/ (retrieved Jun. 5, 2019), although expressions of the character are sufficient, and functions are various, when viewed as a portable communication terminal, the portability is rather inferior to a general smartphone, for example. In addition, some users may be reluctant to carry a robot (figurine).

It could therefore be helpful to provide a thin portable communication terminal capable of operating as a robot while maintaining portability, and a control method and a control program thereof.

SUMMARY

I thus provide:

A thin portable communication terminal includes: a casing having a rectangular parallelepiped shape; one pair of arm portions each having one end that is axially supported to be freely turnable with respect to corresponding one of both side faces on long sides of the casing; hand portions each disposed at the other end of corresponding one of the one pair of arm portions; and a leg portion that is disposed on one side face that is on a short side of the casing and is capable of independent movement.

A method of controlling a thin portable communication terminal includes: a casing having a rectangular parallelepiped shape; one pair of arm portions each having one end that is axially supported to be freely turnable with respect to corresponding one of both side faces on long sides of the casing; hand portions each disposed at the other end of corresponding one of the one pair of arm portions; a leg portion that is disposed on one side face that is on a short side of the casing and is capable of independent movement; a communication unit that is used for communicating with other communication terminals; a drive control unit that is used for controlling independent travel using the leg portion; and an imaging unit that is used for imaging the vicinity, where the method includes: a receiving step of receiving communication from another communication terminal using the communication unit; an imaging step of imaging the vicinity using the imaging unit; and a control step of receiving reception of communication from the other communication terminal in the receiving step and controlling the leg portion such that the leg portion approaches a user of the thin portable communication terminal on the basis of a captured image captured in the imaging step using the drive control unit.

A method of controlling a thin portable communication terminal includes: a casing having a rectangular parallelepiped shape; one pair of arm portions each having one end that is axially supported to be freely turnable with respect to corresponding one of both side faces on long sides of the casing; hand portions each disposed at the other end of corresponding one of the one pair of arm portions; a leg portion that is disposed on one side face that is on a short side of the casing and is capable of independent movement; a drive control unit that is used for controlling independent travel using the leg portion; and an imaging unit that is used for imaging the vicinity, where the method includes: an imaging step of imaging the vicinity using the imaging unit; and a control step of controlling the leg portion such that a user of the thin portable communication terminal is included in an imaging range of the imaging unit on the basis of a captured image acquired by performing imaging in the imaging step.

A control program for a thin portable communication terminal causing a computer of the thin portable communication terminal includes: a casing having a rectangular parallelepiped shape; one pair of arm portions each having one end that is axially supported to be freely turnable with respect to corresponding one of both side faces on long sides of the casing; hand portions each disposed at the other end of corresponding one of the one pair of arm portions; a leg portion that is disposed on one side face that is on a short side of the casing and is capable of independent movement; a communication unit that is used for communicating with other communication terminals; a drive control unit that is used for controlling independent travel using the leg portion; and an imaging unit that is used for imaging the vicinity, to embody: a receiving function of receiving communication from another communication terminal using the communication unit; an imaging function of imaging the vicinity using the imaging unit; and a control function of receiving reception of communication from the other communication terminal using the receiving function and controlling the leg portion such that the leg portion approaches a user of the thin portable communication terminal on the basis of a captured image captured using the imaging function using the drive control unit.

A control program for a thin portable communication terminal causes a computer of the thin portable communication terminal includes: a casing having a rectangular parallelepiped shape; one pair of arm portions each having one end that is axially supported to be freely turnable with respect to corresponding one of both side faces on long sides of the casing; hand portions each disposed at the other end of corresponding one of the one pair of arm portions; a leg portion that is disposed on one side face that is on a short side of the casing and is capable of independent movement; a drive control unit that is used for controlling independent travel using the leg portion; and an imaging unit that is used for imaging the vicinity, to embody: an imaging function of imaging the vicinity using the imaging unit; and a control function of controlling the leg portion such that a user of the thin portable communication terminal is included in an imaging range of the imaging unit on the basis of a captured image acquired by performing imaging using the imaging function.

In the thin portable communication terminal described above, the leg portion may be configured to be positioned between the hand portions when the arm portions are located at overlapping positions with respect to the casing in a side view.

In the thin portable communication terminal described above, the arm portions may be flat plate-shaped members running in parallel with side faces of the long sides of the casing.

In the thin portable communication terminal described above, the arm portions may have a width equal to or smaller than a thickness of the casing.

The thin portable communication terminal described above may further include rotation motors used for turning rotation shafts that axially support the arm portions at the corresponding ends of the one pair of arm portions.

In the thin portable communication terminal described above, the hand portions may be vehicle wheels connected to the corresponding other ends of the arm portions to be freely turnable.

In the thin portable communication terminal described above, the hand portions may have a size equal to or smaller than a thickness of the casing when the arm portions are located at overlapping positions with respect to the casing in a side view.

In the thin portable communication terminal described above, the leg portion may include a rotation shaft having a direction of the short side of the casing as its axial direction, a right wheel disposed at one end of the rotation shaft, a left wheel disposed at the other end of the rotation shaft, a first running motor driving the right wheel, and a second running motor driving the left wheel.

In the thin portable communication terminal described above, the leg portion may have a size equal to or smaller than a thickness of the casing in the side view.

The thin portable communication terminal described above may further include an image control unit that generates a face image of a character displayed on a display unit, and the casing may include the display unit used for displaying an image.

In the thin portable communication terminal described above, the thin portable communication terminal may include a storage unit storing a plurality of face images for the character, and the image control unit may generate a face image of the character by selecting one from among the plurality of face images.

The thin portable communication terminal described above may further include a communication unit that is used for communicating with other communication terminals.

The thin portable communication terminal described above may further include a drive control unit that is used for controlling independent travel using the leg portion, and the drive control unit may control the leg portion such that the leg portion approaches a user of the thin portable communication terminal when the communication unit accepts communication from another communication terminal.

The thin portable communication terminal described above may further include an imaging unit that is used for imaging the vicinity, the storage unit may store image information representing the user, and the drive control unit may identify a position of the user on the basis of a captured image captured by the imaging unit and the image information and control the leg portion such that the leg portion approaches the user.

The thin portable communication terminal described above may further include an imaging unit that is used for imaging the vicinity, the storage unit may store image information representing the user, and the drive control unit may identify a position of the user on the basis of a captured image captured by the imaging unit and the image information and control the leg portion to allow the imaging unit to continue to image the user.

In the thin portable communication terminal described above, the storage unit may further store a drive pattern used for driving the arm portions and the leg portion of the thin portable communication terminal, and the control unit may control the arm portions and the leg portion in accordance with the drive pattern.

In the thin portable communication terminal described above, the communication unit may receive another drive pattern used for driving the arm portions and the leg portion of the thin portable communication terminal, and the control unit may control the arm portions and the leg portion in accordance with the other drive pattern.

In the thin portable communication terminal described above, the control unit may include an acquisition unit that acquires inputs from a user for the arm portions and the leg portion and a generation unit that generates a drive pattern embodying the inputs acquired by the acquisition unit, and the communication unit may transmit the drive pattern generated by the generation unit to an external device.

A thin portable communication terminal has a form that includes hand portions and a leg portion, and the leg portion is configured to perform independent movement, and thus a portable communication terminal capable of operating as a robot without degrading portability can be provided.

BRIEF DESCRIPTION OF THE DRAWINGS

FIG. 1A is a perspective view illustrating an outward appearance of a portable communication terminal from a front side.

FIG. 1B is a perspective view illustrating an outward appearance of the portable communication terminal from a rear side.

FIG. 5 is a data concept diagram illustrating a data configuration example of user information stored by the portable communication terminal.

FIG. 6 is a data concept diagram illustrating a data configuration example of character information stored by the portable communication terminal.

FIGS. 17A to 17C are outward appearance views illustrating another configuration Example 2 of the portable communication terminal.

Figure 2A:
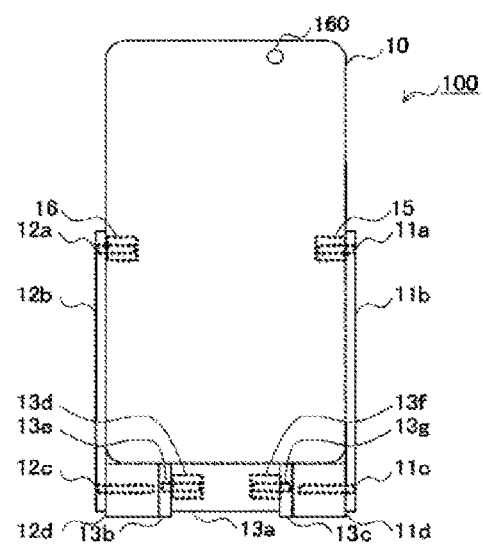
FIG. 2A is a plan view of the portable communication terminal.

REFERENCE SIGNS LIST 100, 100a, 100b Portable communication terminal
10 Casing
11 Arm portion (left arm)
11a Turning shaft
11b Arm plate
11c Turning shaft
11d Hand portion
12 Arm portion (right arm)
12a Turning shaft
12b Arm plate
12c Turning shaft
12d Hand portion
13 Leg portion
13a Protrusion
13b Right wheel
13c Left wheel
13d First running motor
13e Turning shaft
13f Second running motor
13g Turning shaft
15, 16 Rotation motor
110 Communication unit
120 Storage unit
130 Input unit
140 Display unit
150 Voice output unit
160 Imaging unit
170 Control unit

DETAILED DESCRIPTION

Example 1

A portable communication terminal 100 is a thin portable communication device represented by so-called a smartphone, a tablet terminal, for example, is a device that is caused to be able to function also as a robot, and may also be referred to as a portable terminal of an independently mobile type. Hereinafter, one example of the portable communication terminal according to this example will be described with reference to the drawings.

Configuration

Structure of Portable Communication Terminal 100

Figure 2B:
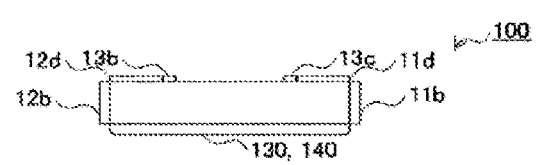
FIG. 2B is a top view of the portable communication terminal.
Figure 2C:
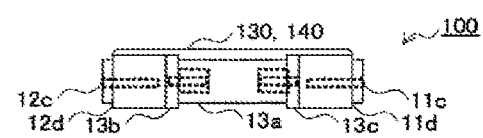
FIG. 2C is a bottom view of the portable communication terminal.
Figure 3A:
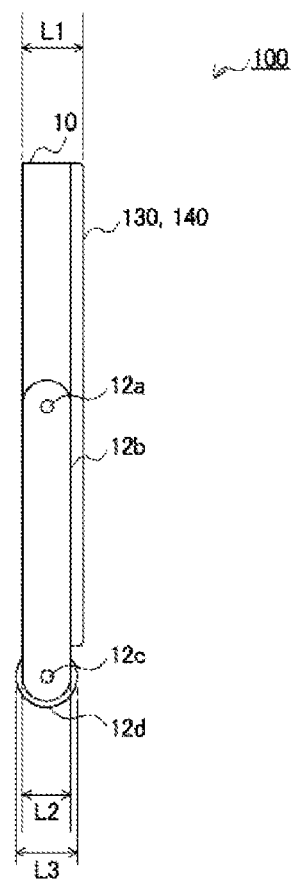
FIG. 3A is a left side view of the portable communication terminal.
Figure 3B:
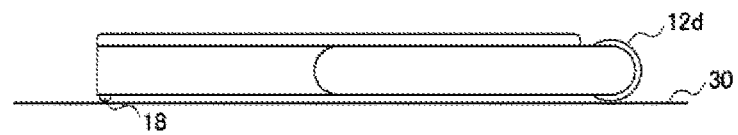
FIG. 3B is a side view illustrating one form of the portable communication terminal.

First, the configuration of the portable communication terminal 100 will be described with reference to FIGS. 1A to 3B. FIG. 1A is a perspective view of the portable communication terminal 100 from the front side, and FIG. 1B is a perspective view of the portable communication terminal 100 from the rear side. FIG. 2A is a plan view of the portable communication terminal 100 from the front side, FIG. 2B is a top view of the portable communication terminal 100, and FIG. 2C is a bottom view of the portable communication terminal 100. FIG. 3A is a left side view of the portable communication terminal 100, and FIG. 3B is a diagram illustrating one travel form of the portable communication terminal 100. The rear side view of the portable communication terminal 100 is approximately the same as the front view thereof, the main difference being the presence/absence of a touch panel and a camera, and thus will be omitted in the drawing.

As illustrated in FIGS. 1A to 3B, the portable communication terminal 100 includes a casing 10 having a rectangular parallelepiped shape, one pair of arm portions 11 and 12 each having one end side axially supported to be freely turnable on corresponding one of both side faces of the long side, hand portions 11d and 12d each disposed at the other end of corresponding one of the one pair of arm portions 11 and 12, and a leg portion 13 that is disposed on one side face that is a short side of the casing 10 and is autonomously movable.

As illustrated in FIG. 2A, a rotation motor 15 is included inside the casing 10 of the portable communication terminal 100, and the rotation motor 15 freely turns a turning shaft 11a clockwise and counterclockwise. The rotation motor 15 is driven by electric power supplied from a power supply (not illustrated) of the portable communication terminal 100 and is controlled by a control unit 170 (details will be described below) of the portable communication terminal 100. The turning shaft 11a is connected (fixed) to one end of an arm plate 11b. The arm plate 11b is a member having a flat plate shape running in parallel with the side face of the casing 10 on the long side. By the turning shaft 11a being turned by the rotation motor 15, the arm plate 11b also turns around the turning shaft 11a. The turning shaft 11c is connected (fixed) to the other end of the arm plate 11b, and the hand portion 11d is connected to the turning shaft 11c to be freely turnable. The hand portion 11d freely turns around the turning shaft 11c. The arm portion 11 functions as a left arm in the portable communication terminal 100.

In the same manner, a rotation motor 16 is included inside the casing 10 of the portable communication terminal 100, and the rotation motor 16 freely turns a turning shaft 12a clockwise and counterclockwise. In the same manner as the rotation motor 15, the rotation motor 16 is also driven by electric power supplied from the power supply (not illustrated) of the portable communication terminal 100 and is controlled by the control unit 170 (details will be described below) of the portable communication terminal 100. The turning shaft 12a is connected (fixed) to one end of an arm plate 12b. The arm plate 12b is a member having a flat plate shape running in parallel with the side face of the casing 10 on the long side. By the turning shaft 12a being turned by the rotation motor 16, the arm plate 12b also turns around the turning shaft 12a. A turning shaft 12c is connected (fixed) to the other end of the arm plate 12b, and the hand portion 12d is connected to the turning shaft 12c to be freely turnable. The hand portion 12d freely turns around the turning shaft 12c. The arm portion 11 functions as a right arm in the portable communication terminal 100.

The portable communication terminal 100 includes a protrusion 13a configured to protrude from the casing 10. As illustrated in FIGS. 2A and 2C, a first running motor 13d and a second running motor 13f are included in the protrusion 13a. The first running motor 13d is driven by electric power supplied from the power supply of the portable communication terminal 100 and freely turns a turning shaft 13e. The second running motor 13f is driven by electric power supplied from the power supply of the portable communication terminal 100 and freely turns a turning shaft 13g. The first running motor 13d and the second running motor 13f are individually controlled. As can be understood from FIG. 2A, both the turning shaft 13e and the turning shaft 13g are parallel to the short side of the casing 10.

A right wheel 13b is connected (fixed) to the turning shaft 13e, and the right wheel 13b rotates in accordance with turning of the turning shaft 13e. In the same manner, a left wheel 13c is connected (fixed) to the turning shaft 13g, and the left wheel 13c rotates in accordance with turning of the turning shaft 13g. The leg portion 13 is configured by the first running motor 13d and the second running motor 13f installed in the protrusion 13a, and the protrusion 13a, the turning shaft 13e and the turning shaft 13g, and the right wheel 13b and the left wheel 13c turned by the corresponding turning shafts.

As illustrated in FIGS. 1A to 3B, when the arm portion 11 is located at a position overlapping the casing 10 in the side view, the leg portion 13 is configured to be positioned between the hand portion 11d and the hand portion 12d.

In addition, as illustrated in FIG. 3A, when the arm portion 12 is located at a position overlapping the casing 10, the portable communication terminal 100 is configured to have a flat plate shape. This applies to the arm portion 11 in the same manner. That is, a width L2 of the arm plate 12b of the arm portion 12 is configured to be equal to or smaller than a thickness L1 of the casing 10. Thus, the arm plate 12b is configured to be thinner than the casing 10 in the thickness direction of the casing 10, and the portable communication terminal 100 is configured to be compact as a whole. This applies to the arm portion 11 in the same manner.

In addition, a size of the hand portion 12d, i.e., a diameter L3, is configured to be equal to or smaller than the thickness L1 of the casing 10. In the same manner, a diameter of the hand portion 11d is configured to be equal to or smaller than the thickness L1 of the casing 10, and the hand portion 11d has a diameter that has the same length as the hand portion 12d. By configuring the hand portions 11d and 12d to have a size equal to or smaller than the thickness of the casing 10, the portable communication terminal 100 can be configured to be thin as a whole, and the portability of the portable communication terminal 100 can be improved. In addition, such measures are measures to embody slimming down with the portability of the portable communication terminal 100 taken into account, and deviations in a range not degrading the portability are allowed.

Although the size of the leg portion 13 is not mentioned, it is preferable that diameters of the right wheel 13b and the left wheel 13c composing the leg portion 13 be the same as diameters of the hand portions 11d and 12d. In addition, by configuring the diameters of the right wheel 13b and the left wheel 13c to be equal to or smaller than the thickness L1 of the portable communication terminal 100, slimming-down of the entire portable communication terminal 100 can be achieved, and by configuring the diameters of the right wheel 13b and the left wheel 13c to be slightly larger than the thickness L1 of the portable communication terminal 100, a state in which the portable communication terminal 100 is laid down, i.e., as illustrated in FIG. 3B, a form in which travel with the right wheel 13b, the left wheel 13c and the other end of the portable communication terminal 100 opposite to a side on which the leg portion 13 is disposed grounded to a ground surface 30, is possible. At this time, at an end of the portable communication terminal 100 on a side opposite to the side on which the leg portion 13 is disposed, for example, a protrusion 18 made of a resin may be configured to be provided in the casing 10 such that the casing 10 of the portable communication terminal 100 is not damaged when it travels in the form illustrated in FIG. 3B. In addition, this protrusion 18 may be embodied by a ball, which is buried in the casing 10 of the portable communication terminal 100, to be able to turn freely. In such a configuration, when travel in the form illustrated in FIG. 3B is performed, the portable communication terminal 100 can be caused to travel more smoothly.

Functional Configuration

The portable communication terminal 100 is, as described above, a portable communication terminal such as a general smartphone or a tablet terminal, and as illustrated in FIGS. 1A and 2A, a touch panel functioning as an input unit 130 and a display unit 140 are disposed on the surface thereof, and an imaging unit 160, i.e., a camera, is disposed thereon. Hereinafter, the functional configuration of the portable communication terminal 100 will be described.

Figure 4:
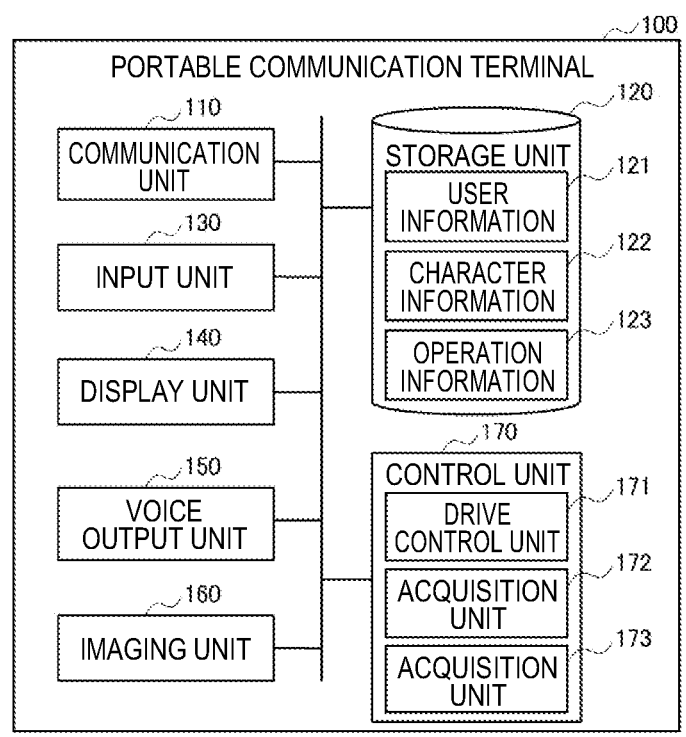
FIG. 4 is a block diagram illustrating a functional configuration example of the portable communication terminal.

FIG. 4 is a block diagram illustrating a functional configuration example of the portable communication terminal 100. As illustrated in FIG. 4, the portable communication terminal 100 includes a communication unit 110, a storage unit 120, an input unit 130, a display unit 140, a voice output unit 150, an imaging unit 160, and a control unit 170.

The communication unit 110 is a communication interface that has a function of receiving information from other devices through a network. The communication unit 110 transfers received information to the control unit 170. In addition, the communication unit 110 transmits information instructed from the control unit 170 to an external device. In addition to exchange of electronic information such as mail obtained when functioning as a portable communication terminal, information of a website obtained while browsing the Internet, and a voice signal, for example, obtained in a phone call, the communication unit 110 exchanges operation information obtained when the portable communication terminal 100 operates as a robot.

The storage unit 120 has a function of storing various programs and data required for the operation of the portable communication terminal 100. For example, the storage unit 120 is embodied by various storage media such as a hard disk drive (HDD), a solid state drive (SSD), and a flash memory. The storage unit 120 stores user information 121 relating to a user holding the portable communication terminal 100, character information 122 used when a character is imitated when the portable communication terminal 100 operates as a robot, and operation information 123 used when the portable communication terminal 100 operates as a robot. Details of the information will be described below.

The input unit 130 has a function of accepting an input from a user. For example, the input unit 320 can be embodied by a touch panel, but is not limited to the touch panel. The input unit 130 transfers input details accepted from the user to the control unit 170. The input unit 130 may accept an input using a voice, and the input unit 130 can be embodied using a microphone in that configuration. In addition, the input unit 130 may be embodied using another hardware key.

The voice output unit 150 has a function of outputting a voice signal in accordance with an instruction from the control unit 170. For example, the voice output unit 150 can be embodied using a speaker. The voice output unit 150, for example, can output a voice based on voice information set in the character information 122. In addition, the voice output unit 150 can also output a voice through a phone call.

The imaging unit 160 is a camera having a function of imaging the vicinity in accordance with an instruction from the input unit 130 or the control unit 170. In this example, although an example in which the imaging unit 160 is disposed on the front-face side of the portable communication terminal 100 is illustrated, it may be disposed on the rear-face side or may be disposed on both faces.

The control unit 170 controls each unit of the portable communication terminal 100 and, for example, may be embodied using a central processing unit (CPU), a microprocessor, an ASIC, an FPGA, for example. In addition, the control unit 170 is not limited to such an example and may be any unit as long as it has a function of controlling the portable communication terminal 100. By reading and executing various programs stored in the storage unit 120, the control unit 170 embodies functions to be achieved by the portable communication terminal 100. In accordance with a user's instruction input through the input unit 130, the control unit 170 performs a process according to instruction details. In addition, the control unit 170 performs processing of information transferred from the communication unit 110.

The control unit 170 includes a drive control unit 171, an acquisition unit 172, and a generation unit 173 as functions to be achieved by the portable communication terminal 100.

When the portable communication terminal 100 functions as a robot, the drive control unit 171 controls the arm portions 11 and 12 and the leg portion 13. By controlling the rotation motor 15 operating the arm portion 11, the rotation motor 16 operating the arm portion 12, the first running motor 13d operating the right wheel 13b, and the second running motor 13f operating the left wheel 13c in accordance with the operation information 123 defining an operation pattern set in advance, the drive control unit 171 operates the portable communication terminal 100 as a robot. For example, the drive control unit 171 can move the portable communication terminal 100 forward by rotating both the first running motor 13d and the second running motor 13f counterclockwise as seen from the right face and can move the portable communication terminal 100 backward by rotating both running motors clockwise as seen from the right face. In addition, by rotating the first running motor 13d and the second running motor 13f in opposite directions, the drive control unit 171 also can turn the portable communication terminal 100 at that position.

From a rotation angle and an angular velocity of each motor acquired by a user of the portable communication terminal 100 directly moving the portable communication terminal 100, i.e., directly moving the arm portions 11 and 12 and the right wheels 13b and 13c, the acquisition unit 172 acquires movement information representing how the user has moved the portable communication terminal 100. The acquisition unit 172 transfers the acquired movement information to the generation unit 173.

The generation unit 173 generates an operation pattern that can embody the same operation on the basis of the movement of each motor acquired by the acquisition unit 172. The operation pattern is directed to information that represents a rotation angle and an angular velocity of each motor in the direction of the time axis. By operating each motor with a rotation angle and an angular velocity that are the same as the rotation angle and the angular velocity represented in the operation pattern, the acquisition unit 172 generates an operation pattern representing changes of the rotation angle and the angular velocity of each motor over time. The generation unit 173 transmits the generated operation pattern, for example, to a server apparatus storing operation patterns as an external apparatus or a portable communication terminal operating as a robot in the same manner as in the portable communication terminal 100 illustrated in this example through the communication unit 110. In addition, the generation unit 173 may store the generated operation pattern in the storage unit 120.

The functional configuration of the portable communication terminal 100 has been described above.

Data

Various types of information used by the portable communication terminal 100 will be described.

FIG. 5 is a data concept diagram illustrating a configuration example of the user information 121. As illustrated in FIG. 5, the user information 121 stores feature portions of a face of a user for each of a plurality of users. In the example illustrated in FIG. 5, image data and information of eyes, a nose, a mouth, and an outline of a face of a user are stored in association with each other for each of a plurality of users. That is, the user information 121 is directed to information in which a user ID 501, an image file 502, eyes 503, a nose 504, a mouth 505, and an outline 506 are associated with each other. The user information 121 is directed to information that is used for the portable communication terminal 100 to perform an operation following a user or a following imaging operation. In the user information 121, information about a plurality of users may be registered. When a user following operation is performed, designation of a user to follow is accepted.

FIG. 6 is a data concept diagram illustrating a configuration example of the character information. The character information 122 is directed to information that is referred to by the portable communication terminal 100 to imitate any character.

As illustrated in FIG. 6, the character information 122 is directed to information in which a character 601, an accumulated usage time 602, a screen display 603, moving portion control 604, and arm portion control 605 are associated with each other. The character 601 is directed to information that is used for identifying each character. The accumulated usage time 602 represents a time in which operations performed by a corresponding character is used. The screen display 603 is directed to information that represents image details of a character displayed on the display unit 140 when the portable communication terminal 100 is operated to imitate the corresponding character. The moving portion control 604 is directed to control information that is used to drive the first running motor 13*d* and the second running motor 13*f* to operate the leg portion 13. In the same manner, the arm portion control 605 is directed to control information that is used to control the rotation motors 15 and 16 of the arm portions 11 and 12.

In the example illustrated in FIG. 6, a monkey mode (animal mode), a female child mode (human mode), and a super car mode (riding object mode), for example, are provided as a plurality of characters. Since the character information 122 is included, the portable communication terminal 100 can embody an operation imitating a certain character. This character information 122 may be pre-installed in the storage unit 120 of the portable communication terminal 100 or may be configured to be downloadable from an external server apparatus, for example. In addition, although not presented in FIG. 6, any information relating to a character may be additionally associated therewith. For example, one or more pieces of voice information used for a corresponding character to have a conversation may be associated therewith, and furthermore, condition information of when each piece of voice information is output may be also associated therewith.

In FIG. 6, a plurality of behavior patterns is further stored for each character. A behavior pattern is a detailed control mode of each character and changed in accordance with the frequency of user's touch on the portable communication terminal 100 or is changed in accordance with a period in which a character selected by a user is used. In this example, the portable communication terminal 100 changes a display screen of the display unit 140 as a behavior pattern or changes control of the leg portion 13 and the arm portions 11 and 12 in accordance with the accumulated usage time 602. By using the behavior pattern, the portable communication terminal 100 can be controlled such that it follows a user or may be controlled such that a body condition becomes ill. The behavior pattern can be changed by the portable communication terminal 100 through learning or can be changed by an external server apparatus transferring character information.

Figure 7:
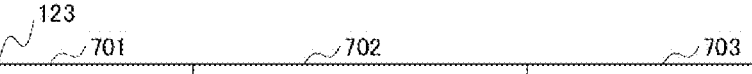
FIG. 7 is a data concept diagram illustrating a data configuration example of operation information stored by the portable communication terminal.

FIG. 7 is a diagram illustrating an example of the operation information 123. The operation information 123 is directed to information representing an example of the operation pattern used when the portable communication terminal 100 is operated as a robot independent from the character information 122 as illustrated in FIG. 6. As illustrated in FIG. 7, the operation information 123 is directed to information in which an expression 701, moving portion control 702, and arm portion control 703 are associated with each other.

The expression 701 is directed to information representing an image displayed on the display unit 140, and an image of the generated expression is displayed in corresponding information on the display unit 140. The moving portion control 702 is directed to control information used for controlling the first running motor 13*d* and the second running motor 13*f* of the leg portion 13 at the time of a corresponding expression. In addition, the arm portion control 703 is directed to control information to control the rotation motors 15 and 16 of the arm portions 11 and 12 at the time of a corresponding expression.

In accordance with the operation information 123 being present, the portable communication terminal 100 can smoothly operate as a robot.

Operation

Figure 8:
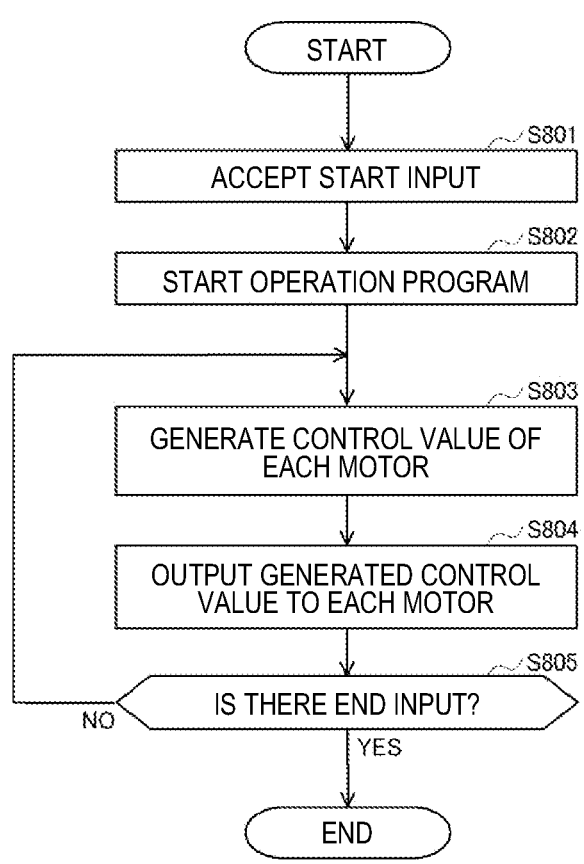
FIG. 8 is a flowchart illustrating one operation example of the portable communication terminal.

FIG. 8 is a flowchart illustrating one example of an operation form of the portable communication terminal 100.

As illustrated in FIG. 8, the portable communication terminal 100 accepts a start input for the input unit 130 from a user (Step S801). In FIG. 8, the start input is directed to an input that causes the portable communication terminal 100 to operate as a robot and, for example, it means that an input for starting a program installed in the portable communication terminal 100 is accepted. The program may be pre-installed at the time of shipment of the portable communication terminal 100 or may be downloaded from a network and installed later. The input unit 130 transfers the input details to the control unit 170.

Next, the control unit 170 of the portable communication terminal 100 reads an operation program for operating the portable communication terminal 100 as a robot from the storage unit 120 and executes the read operation program (Step S802).

The control unit 170 generates control values of motors included in the portable communication terminal 100, i.e., the rotation motors 15 and 16 and the first running motor 13*d* and the second running motor 13*f* in accordance with the operation program (Step S803).

Next, the control unit 170 outputs the generated control values of the motors to the corresponding motors (Step S804). In accordance with this, each of the motors performs predetermined rotation. Thus, when the first running motor 13*d* and the second running motor 13*f* are driven, the portable communication terminal 100 can perform movement operations such as moving forward, moving backward, turning around, for example. In addition, when the rotation motors 15 and 16 operate, the arm portions 11 and 12 move, and thus expressions of the portable communication terminal 100 as arms can be performed. Thus, the operation of the portable communication terminal 100 as a robot can be embodied as well.

The control unit 170 of the portable communication terminal 100 determines whether there is an end input for the input unit 130 from a user (Step S805). Although the end input described here is directed to an end input to the operation program operating the portable communication terminal 100 as a robot, it may be an input for performing shutdown processing of the portable communication terminal 100. When there is an end input (Yes in Step S805), the process is completed. When there is no end input (No in Step S805), the process returns to the process in Step S803.

Figure 9:
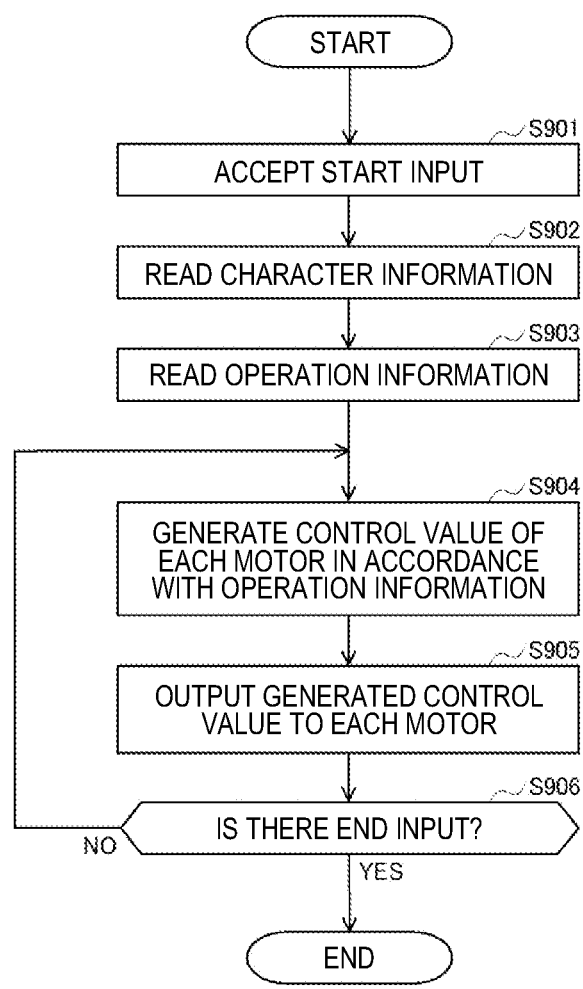
FIG. 9 is a flowchart illustrating an operation example for operating the portable communication terminal as a character.

FIG. 9 is a flowchart illustrating an example of when the portable communication terminal 100 moves in accordance with an operation pattern set in advance.

As illustrated in FIG. 9, the portable communication terminal 100 accepts a start input for the input unit 130 from a user (Step S901). In FIG. 9, the start input is directed to an input for the portable communication terminal 100 to perform an operation imitating a certain character as a robot and, for example, it means that an input for starting a program installed in the portable communication terminal 100 is accepted. The program may be pre-installed at the time of shipment of the portable communication terminal 100 or may be downloaded from a network and installed later. The input unit 130 transfers the input details to the control unit 170.

The control unit 170 reads the character information 122 stored in the storage unit 120 in accordance with the details transferred from the input unit 130 (Step S902). Next, the control unit 170 reads operation information corresponding to the character information 122 (Step S903). The operation information described here is directed to operation information for performing movement like a character defined in the character information 122.

The drive control unit 171 generates a control value of each motor in accordance with the operation information (Step S904). In addition, the control unit 170 also generates display information for displaying a character image to be displayed in accordance with the character information 122 and displays the display information on the display unit 140.

The drive control unit 171 outputs the generated control values of the motors to the corresponding motors (Step S905). In accordance with this, the portable communication terminal 100 can embody movement imitating the character and can allow a user to raise affection for the portable communication terminal 100.

The control unit 170 of the portable communication terminal 100 determines whether there is an end input to the input unit 130 from a user (Step S905). Although the end input described here is directed to an input for ending the operation of the portable communication terminal 100 as a robot performing movement imitating the character, it may be an end input for the operation program operating as the robot or an input for performing shutdown processing of the portable communication terminal 100. When there is an end input (Yes in Step S905), the process is completed. When there is no end input (No in Step S905), the process returns to the process in Step S904.

Figure 10:
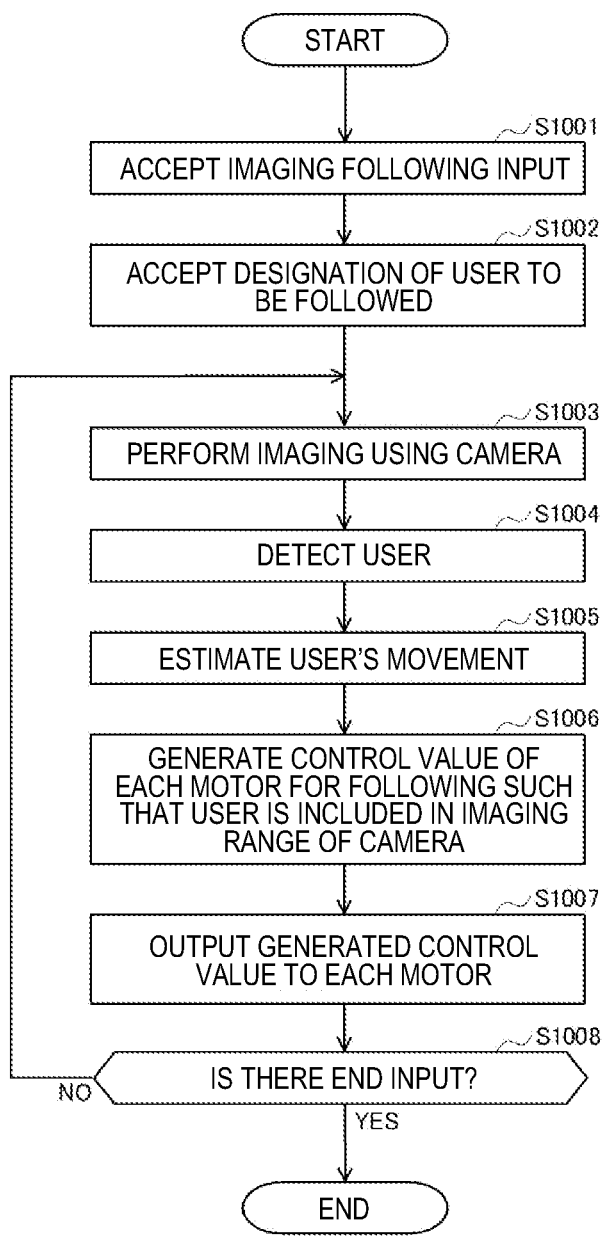
FIG. 10 is a flowchart illustrating an operation example relating to following imaging of the portable communication terminal.

Next, an operation of the portable communication terminal 100 for following imaging of a user holding the portable communication terminal 100 or following imaging of a user registered in the portable communication terminal 100 will be described. FIG. 10 is a flowchart illustrating an operation example of the portable communication terminal 100 for following imaging of a designated user.

As illustrated in FIG. 10, the portable communication terminal 100 accepts an imaging following input to the input unit 130 from a user (Step S1001). In FIG. 10, the imaging following input is directed to an input intended for the portable communication terminal 100 to continue imaging of a designated user until an instruction of an imaging end is accepted from the user, and may be embodied as one function of the operation program for the portable communication terminal 100 to operate as a robot described above or may be embodied by a dedicated program (application). The program may be pre-installed at the time of shipment of the portable communication terminal 100 or may be downloaded from a network and installed later. The input unit 130 transfers the input details to the control unit 170.

In addition, the input unit 130 accepts designation of a user to be followed from the user. The user designated here is directed to one of users registered in the user information 121 (Step S1002). In addition, when one user is registered in the user information 121, the process in Step S1002 can be omitted. The input unit 130 transfers the accepted information for identifying the user to the control unit 170.

The control unit 170 instructs the imaging unit 160 to start imaging (Step S1003). The imaging unit 160 performs imaging in accordance with the instruction. The imaging unit 160 sequentially transfers videos acquired through imaging to the control unit 170. In addition, the imaging performed by the imaging unit 160 may be imaging of a moving image or consecutive imaging of still images.

The control unit 170 detects a position of a user in the transferred captured image by referring to the user information 121 (Step S1004). That is, the control unit 170 detects features of the user represented in the user information 121 from the captured image. For example, this can be embodied using general pattern matching, for example. Then, the control unit 170 identifies a relative positional relation between the portable communication terminal 100 and the user. The control unit 170 detects a user from captured images that have been consecutively imaged (subsequent frames of a moving image or subsequent frames of still images that have been consecutively imaged) and estimates movement of the user (Step S1005). That is, next, the control unit 170 estimates movement of the user (a position at which the user is present when seen from the portable communication terminal 100).

The control unit 170 generates a control value of each motor for following such that the user is included in the imaging range of the imaging unit 160 on the basis of the estimated movement of the user (Step S1006). Then, the control unit 170 outputs each control value that has been generated to a corresponding motor (Step S1007).

For example, when the position of the user is located in the leftward direction from the center in the captured images, it can be detected that the user is moving in the leftward direction when seen from the portable communication terminal 100, and thus, as one example, by rotating the right wheel 13b in the forward direction and rotating the left wheel 13c in the backward direction, turning left is embodied, whereby following imaging can be embodied. In addition, when the occupancy ratio of the user to the entire image in the captured image decreases, the control unit 170 can detect that the user is going away from the portable communication terminal 100, and the portable communication terminal 100 can move to follow the user by rotating both the right wheel 13b and the left wheel 13c in the forward direction such that following imaging of the user can be performed. In contrast, when the occupancy ratio of the user to the entire image in the captured image increases, the control unit 170 can detect that the user is coming closer to the portable communication terminal 100, and the portable communication terminal 100 can move away from the user by rotating both the right wheel 13b and the left wheel 13c in the backward direction such that the user can be placed inside the imaging range as possibly.

The control unit 170 of the portable communication terminal 100 determines whether there is an end input to the input unit 130 from the user (Step S1008). Although the end input described here is directed to an input to end the operation of following imaging of the user using the portable communication terminal 100, it may be an end input to an operation program operating the portable communication terminal 100 as a robot or an input for performing shutdown processing of the portable communication terminal 100. When there is an end input (Yes in Step S1008), the process is completed. When there is no end input (No in Step S1008), the process returns to the process in Step S1003.

Figure 11A:
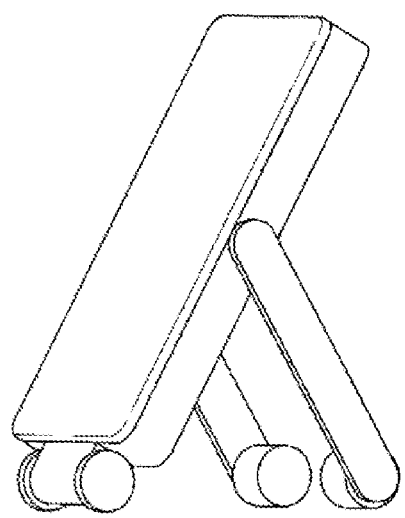
FIG. 11A is an outward appearance view illustrating an example of travel of the portable communication terminal.
Figure 11B:
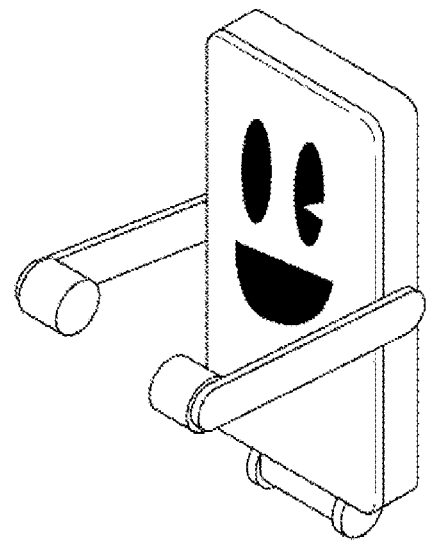
FIG. 11B is an outward appearance view illustrating an appearance of the portable communication terminal operated independently as a robot.

By embodying the following imaging illustrated in FIG. 10, for example, the portable communication terminal 100 can embody the imaging of a self-imaged moving image that is performed by the user alone without any support from any other user. In recent years, although upload of self-imaged moving images to a moving image site has been suddenly performed, by using the portable communication terminal 100 according to this example, a self-imaged moving image having better presence than that performed by the user alone can be performed. Specific example of operation FIGS. 11A and 11B illustrate an operation example of the portable communication terminal 100. FIG. 11A illustrates one example at the time of the portable communication terminal 100 traveling. As illustrated in FIG. 11A, the portable communication terminal 100 can move (travel) using the right wheel 13b and the left wheel 13c of the leg portion 13 as power sources. At this time, the portable communication terminal 100 brings the hand portions 11d and 12d as auxiliary wheels into contact with the ground surface, and thus the portable communication terminal 100 can move in a stable state. In addition, in the example illustrated in FIG. 11A, although the hand portions 11d and 12d are brought into contact with the ground surface such that they are positioned on the rear face side of the portable communication terminal 100, they may be configured to be positioned on the front face side.

FIG. 11B illustrates one example of the portable communication terminal 100 according to another aspect, and, by self-erecting the portable communication terminal 100 through balance control using the motors of the right wheel 13b and the left wheel 13c and the arm portions 11 and 12 and by moving the arm portions 11 and 12 while displaying a face, a body, for example, on the display unit, expressions as a robot can be also embodied.

Summing-Up of Example 1

According to the portable communication terminal 100 of Example 1, by configuring the arm portions 11 and 12 corresponding to arms to be aligned along the side face of the casing 10, the portable communication terminal 100 can be maintained in a thin state, and thus the portability fails to be degraded. In addition, by operating the arm portions 11 and 12 and the leg portion 13 of the portable communication terminal 100, character expressions as a robot can be also embodied by independently moving the portable communication terminal 100, and thus various expressions are embodied, and the portable communication terminal that can be easily felt to be familiar by the user can be provided.

Example 2

In Example 1 described above, the process is completed by the portable communication terminal 100 as one body has been illustrated. In Example 2, an example of operating with being linked to another device will be described.

System Configuration

Figure 12:
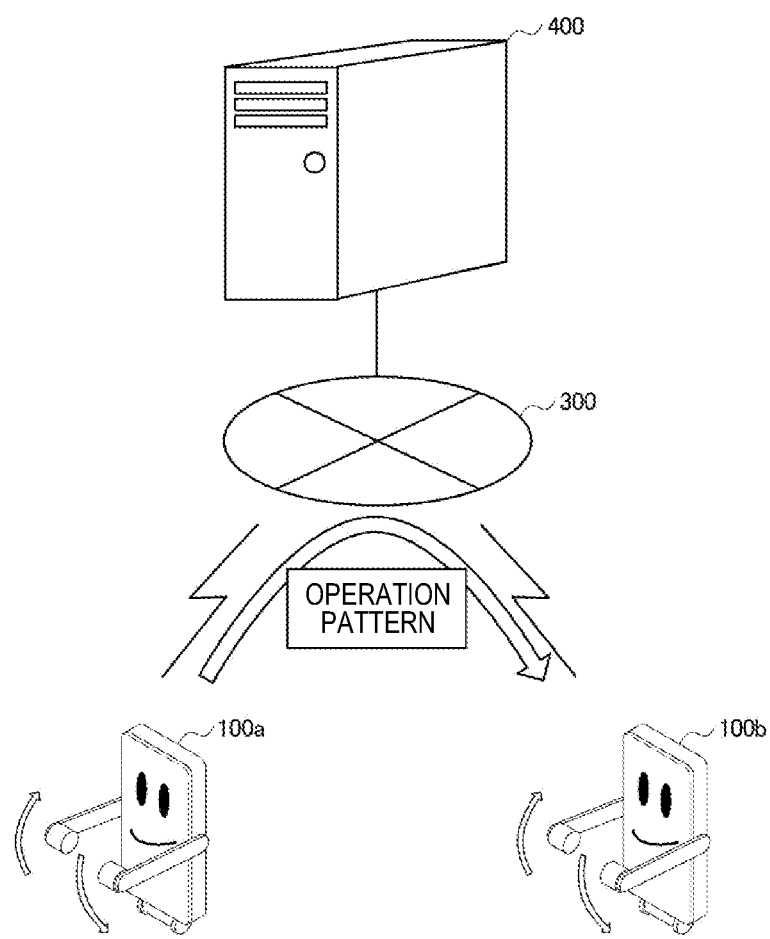
FIG. 12 is a system diagram illustrating a configuration example of a communication network including the portable communication terminal.

As illustrated in FIG. 12, thin portable communication terminals 100 (100a and 100b) communicate with each other through a network 300. The thin portable communication terminals 100a and 100b, as illustrated in Example 1, are thin portable communication terminals that can operate as robots. In addition, a server 400 that can communicate with such thin portable communication terminals 100 may be provided in the network 300.

The configuration of the portable communication terminal 100 is not changed from that illustrated in Example 1, and thus description thereof will be omitted. In addition, the server 400 may be a general server apparatus (computer system) including a communication unit, a control unit, and a storage unit and may have any configuration as long as it is a configuration in which various character information and operation patterns are stored, and character information or an operation pattern that is designated can be transferred in accordance with a request from the portable communication terminal 100.

The network 300 is directed to a network that is used for mutually connecting various devices and, for example, is a wireless network or a wired network. More specifically, the network is directed to a wireless LAN (WLAN), a wide area network (WAN), an integrated service digital network (ISDN), a wireless LAN, long term evolution (LTE), LTE-Advanced, the fourth generation (4G), the fifth generation (5G), a code division multiple access (CDMA), a WCDMA (registered trademark), and an ethernet (registered trademark), for example. In addition, the network is not limited to such examples and, for example, may be a Public Switched Telephone Network (PSTN), Bluetooth (registered trademark), Bluetooth Low Energy, an optical line, an Asymmetric Digital Subscriber Line (ADSL), a satellite communication network, for example, or may be any network. When the network is provided at a house of a user, it may be referred to as a home network. In addition, the network, for example, may be a Narrow Band IoT (NB-IoT) or an enhanced Machine Type Communication (eMTC). The NB-IoT and the eMTC are radio communication systems for IoTs and are network capable of performing long distance communication with low power consumption. In addition, the network may be a combination thereof. Furthermore, the network may include a plurality of different networks acquired by combining such examples. For example, the network may include a wireless network according to LTE and a wired network such as an intranet that is a closed network.

In this Example 2, the portable communication terminal 100a transfers an operation of the portable communication terminal 100a to a different portable communication terminal 100b having the same configuration, and the portable communication terminal 100b imitates the operation of the portable communication terminal 100b. Hereinafter, details thereof will be described.

Operation

Figure 13:
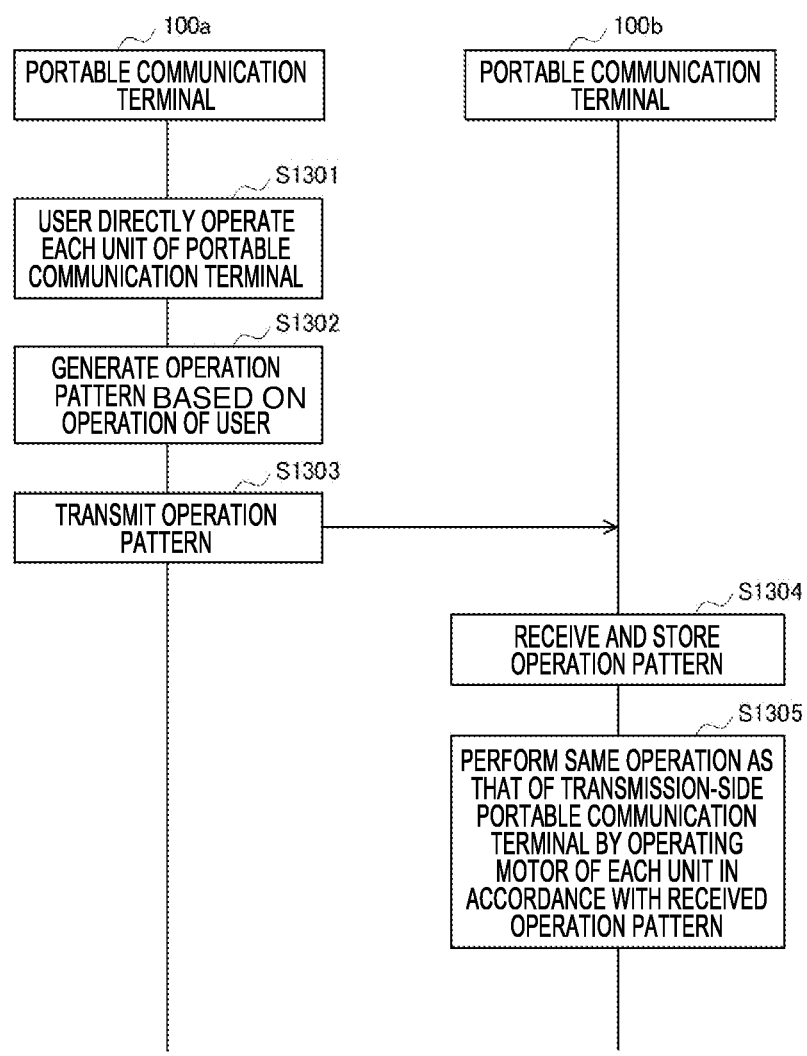
FIG. 13 is a sequence diagram illustrating exchange between portable communication terminals.

FIG. 13 is a sequence diagram illustrating an example of exchange between portable communication terminals according to Example 2.

As illustrated in FIG. 13, the portable communication terminal 100a accepts an operation of moving the portable communication terminal 100a from a user. That is, the user directly operates (moves) arm portions while causing a leg portion of the portable communication terminal 100a to run on the ground surface, for example, using hands (Step S1301).

The portable communication terminal 100a generates an operation pattern on the basis of a user's operation (Step S1302).

Then, the portable communication terminal 100a transmits the generated operation pattern to the portable communication terminal 100b that the user desires to perform the same operation (Step S1303).

The portable communication terminal 100b receives the operation pattern transmitted from the portable communication terminal 100a and stores the received operation pattern in a storage unit (Step S1304).

The portable communication terminal 100b operates a motor of each portion in accordance with the stored operation pattern and performs the same operation as the operation that the user causes the portable communication terminal 100a to take (Step S1305). That is, the portable communication terminal 100b imitates the operation of the portable communication terminal 100a.

Thus, when only speech is insufficient, and any operation is desired to be transferred to a communication partner, for example, the user can transfer an intention, for example, to the partner using this function.

Hereinafter, an operation example of the portable communication terminal 100a that embodies the exchange illustrated in FIG. 13 will be described with reference to FIG. 14, and an operation example of the portable communication terminal 100b that embodies the exchange illustrated in FIG. 13 will be described with reference to FIG. 15.

Figure 14:
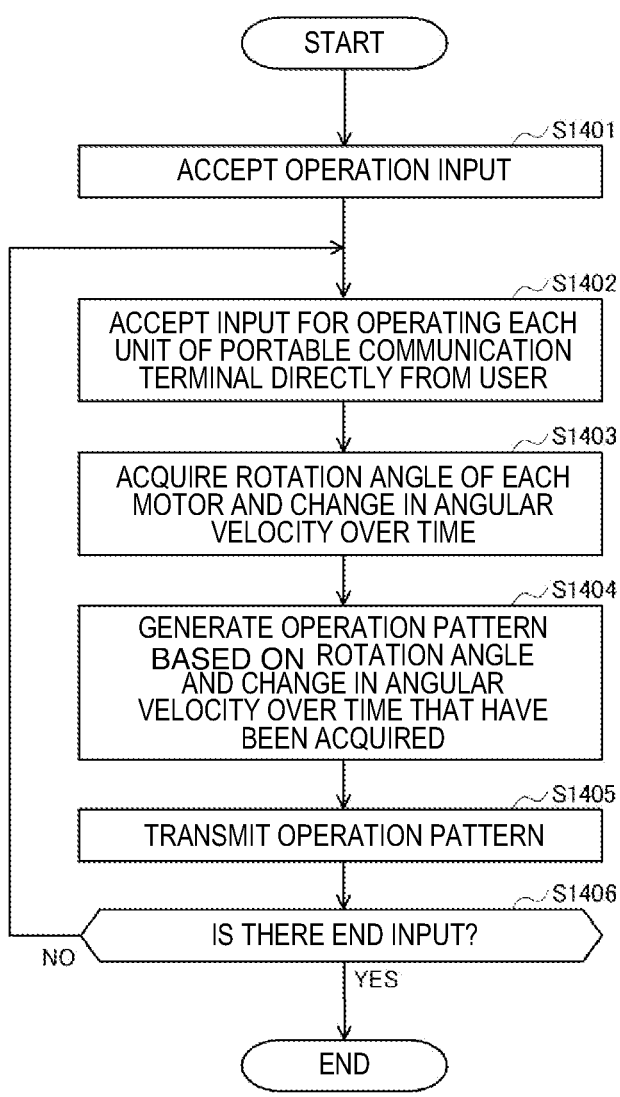
FIG. 14 is a flowchart illustrating an operation example of the portable communication terminal at the time of transmitting an operation.

FIG. 14 is a flowchart illustrating the operation example of the portable communication terminal 100 (100a) that serves as a transmission side of the operation pattern.

As illustrated in FIG. 14, the portable communication terminal 100 accepts a start input to the input unit 130 from a user (Step S1401). In FIG. 14, the start input is directed to an input intended for the portable communication terminal 100 to generate an operation pattern and transmit the operation pattern, is for transmitting the operation of the portable communication terminal 100 described above to another portable communication terminal 100, and may be embodied as one function of an operation program for operating as a robot or may be embodied by a dedicated program (application). The program may be pre-installed at the time of shipment of the portable communication terminal 100 or may be downloaded from a network and installed later. The input unit 130 transfers the input details to the control unit 170.

The portable communication terminal 100 directly accepts an input for moving each portion of the portable communication terminal from a user (Step S1402). That is, the user causes the portable communication terminal 100 to run on the ground surface or moves an arm portion by using his or her hands.

The control unit 170 acquires information indicating an angle and a velocity of rotation of the motor of each portion in accordance with an operation of the user at this time. That is, the control unit 170 acquires information representing a rotation angle of the motor of each portion and a change of an angular velocity over time. The rotation angle can be acquired using an output from a sensor disposed in each motor, and the angular velocity may be acquired using the sensor in the same manner, or the angular velocity may be calculated by acquiring a time required for changing the angle represented by the rotation angle.

The control unit 170 generates an operation pattern on the basis of changes of the rotation angle and the angular velocity over time that have been acquired (Step S1404).

Then, the control unit 170 transmits the generated operation pattern to another portable communication terminal 100 through the communication unit 110 (Step S1405).

The control unit 170 of the portable communication terminal 100 determines whether there is an end input for the input unit 130 from a user (Step S1406). Although the end input described here is directed to an end input for generation and a transmission process of an operation pattern that is performed by the portable communication terminal 100, it may be an input for performing shutdown processing of the portable communication terminal 100, for example. When there is an end input (Yes in Step S1406), the process is completed. When there is no end input (No in Step S1406), the process returns to the process in Step S1402.

Figure 15:
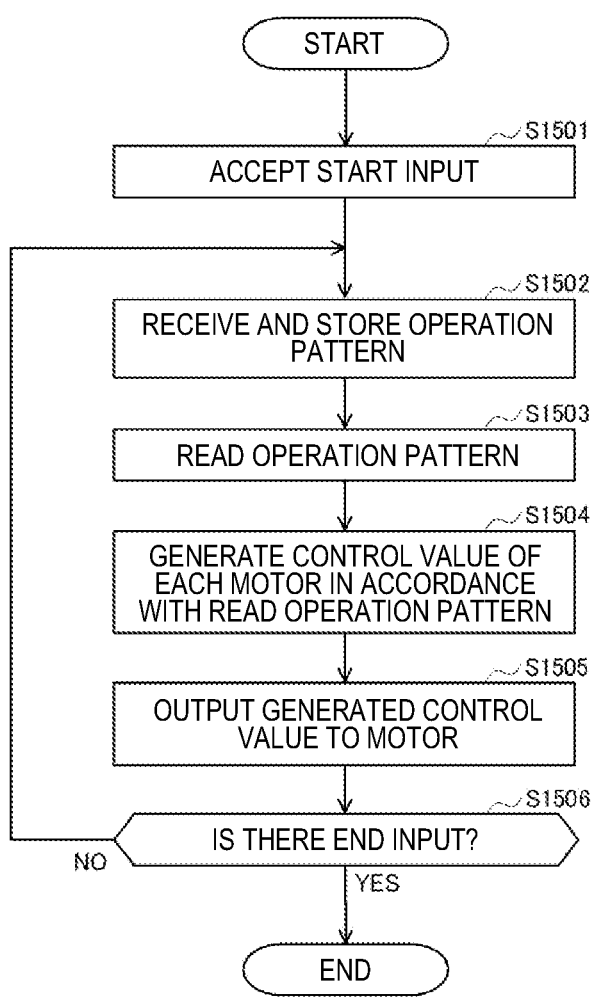
FIG. 15 is a flowchart illustrating an operation example of the portable communication terminal at the time of receiving an operation.

FIG. 15 is a flowchart illustrating an operation example of the portable communication terminal 100 (100b) serving as a transmission side of the operation pattern.

As illustrated in FIG. 15, the portable communication terminal 100 accepts a start input for the input unit 130 from a user (Step S1501). In FIG. 15, the start input is directed to an input intended for the portable communication terminal 100 to receive an operation pattern from another portable communication terminal and operate the portable communication terminal 100 in the operation pattern and may be embodied as one function of the operation program for operating as a robot or may be embodied by a dedicated program (application). The program may be pre-installed at the time of shipment of the portable communication terminal 100 or may be downloaded from a network and installed later. The input unit 130 transfers the input details to the control unit 170.

The communication unit 110 of the portable communication terminal 100 receives an operation pattern from another portable communication terminal. When the operation pattern is received, the communication unit 110 transfers the received operation pattern to the control unit 170. The control unit 170 stores the transferred operation pattern in the storage unit 120 (Step S1502).

The control unit 170 reads the operation pattern stored in the storage unit 120 (Step S1503). In addition, the control unit 170 may be configured to read and perform the operation pattern without storing it in the storage unit 120.

The control unit 170 generates a control value for controlling each motor in accordance with the read operation pattern (Step S1504). Then, the control unit 170 outputs the generated control value to each motor (Step S1505). In accordance with this, the portable communication terminal 100 operates as the operation pattern. That is, the portable communication terminal 100 can imitate the same movement as the operation performed by another portable communication terminal 100.

Summing-Up of Example 2

According to the portable communication terminal 100 of Example 2, a user can transfer the movement of the portable communication terminal 100 to another device. For example, by transmitting an operation pattern from the portable communication terminal 100a to another portable communication terminal 100b of the same type, a user can transfer not only a phone call but also details desired to be transferred in the operation of the portable communication terminal 100a in a more realistic manner. In addition, for example, an operation pattern generated by a user directly operating the arm or causing the arm to travel from the portable communication terminal 100 may be embodied as an operation input to a certain game. Thus, according to the portable communication terminal 100 of Example 2, more information can be transferred to another device.

Modified Example

A device according to the example described above is not limited to the example described above, and it is apparent that the device may be embodied using another technique. Hereinafter, various modified examples will be described.

(1) The configuration of the portable communication terminal 100 according to the example described above is not limited to the forms illustrated in FIGS. 1A to 3B, for example, described in the example described above. Hereinafter, various modified examples will be described with reference to the drawings.

Figure 16A:
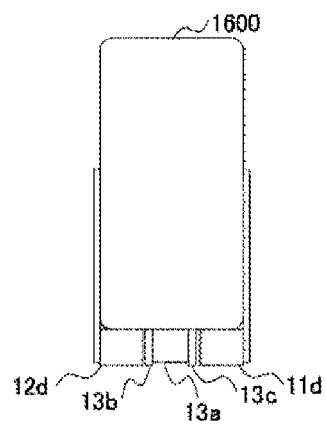
FIGS. 16A to 16C are outward appearance views illustrating another configuration Example 1 of the portable communication terminal.
Figure 16B:
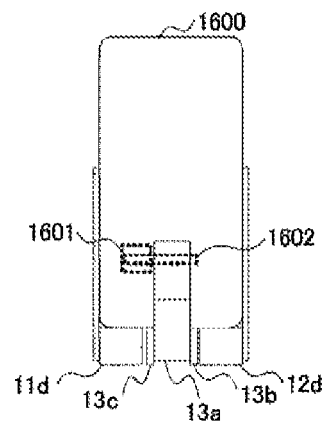
Figure 16C:
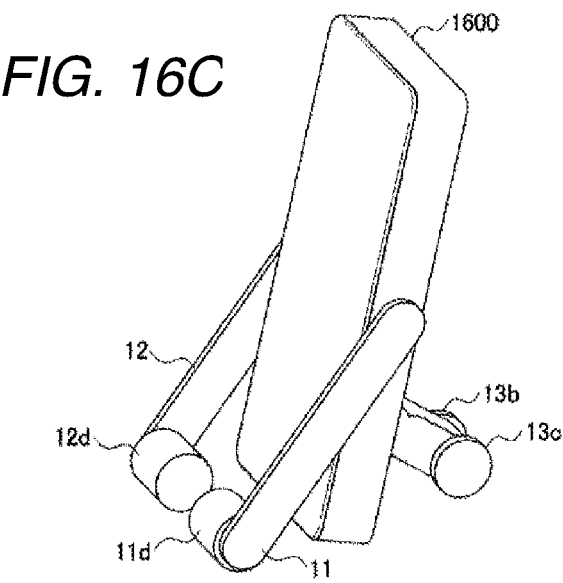

FIGS. 16A to 16C illustrate an example in which the leg portion 13 of the portable communication terminal 100 according to Example 1 can be driven. FIG. 16A is a front view of a portable communication terminal 1600 according to a modified example, and FIG. 16B is a rear view of the portable communication terminal 1600. FIG. 16C is a perspective view illustrating one travel form of the portable communication terminal 1600.

As can be understood from FIG. 16A, the front view of the portable communication terminal 1600 is the same as the front view of the portable communication terminal 100 illustrated in Examples 1 and 2. On the other hand, as can be understood from FIG. 16B, the portable communication terminal 1600 has a structure of a protrusion 13a different from the portable communication terminal 100. That is, while the protrusion 13a of the portable communication terminal 100 has a fixed structure extending from the casing 10, the protrusion 13a of the portable communication terminal 1600 has an end on a side opposite to an end to which the right wheel 13b and the left wheel 13c are connected, which is buried inside the casing of the portable communication terminal 1600, and the end is connected to the casing to be freely turnable using a turning shaft 1602. The turning shaft 1602 passes through the inside of the other end of the protrusion 13*a* and is connected to the casing 10 to axially support the other end of the protrusion 13*a*. The rotation motor 1601 may be connected to the turning shaft 1602, and the turning motor 1601 may be configured to be able to be controlled by the control unit 170.

In accordance with this structure, a structure in which the portable communication terminal 1600, as illustrated in FIG. 16C, the end of the protrusion 13*a* can be taken out from the casing of the portable communication terminal 1600 using the turning shaft 1602 of the other end of the protrusion 13*a* as an axis is formed.

According to the portable communication terminal 1600 having the configuration illustrated in FIGS. 16A to 16C, the portable communication terminal having a higher degree of freedom than that of the portable communication terminal 100 and being capable of performing movement having high stability can be provided. In contrast, the portable communication terminal 100 can provide a portable communication terminal having a capacity of the inside of the casing superior to that of the portable communication terminal 1600 and having improved functionality more than the portable communication terminal 1600 in other aspects.

FIGS. 17A to 17C are diagrams illustrating one example of a portable communication terminal 1700 illustrating an example in which the leg portion is embodied without providing the protrusion 13*a*. FIG. 17A is a front view of the portable communication terminal 1700, FIG. 17B is a rear view of the portable communication terminal 1700, and FIG. 17C is a perspective view illustrating one travel form of the portable communication terminal 1700.

As can be understood from FIGS. 17A to 17C, in the portable communication terminal 1700, the right wheel 13*b* and the left wheel 13*c* are disposed not in the protrusion 13*a* but at ends of side faces of the casing. In accordance with this structure, instead of folding hand portions to come around the leg portion, an exit portion is configured to be located on the top face side, and thus the shape as a thin portable communication terminal can be maintained. In the portable communication terminal 1700, an example in which a head portion 1701 of a robot is disposed between the hand portions is illustrated.

In addition, in this configuration, the portable communication terminal 1700 may include a support portion 1702 on the rear face thereof. An end of the support portion 1702 is attached to be able to freely turn with respect to one end of the portable communication terminal 1700 and, as illustrated in FIG. 17C, becomes a support when the portable communication terminal 1700 moves. By including the support portion 1702, the portable communication terminal 1700 can stably move. The turning of this support portion 1702 may be drawn by a user or may be controlled by the control unit 170 of the portable communication terminal 1700 by including a motor inside the portable communication terminal 1700.

In addition, since the portable communication terminal 1700 can be regarded to have a schematic form having the head portion 1701, a robot may be expressed by displaying clothes, for example, as exteriors of the robot or a character on the display unit 140 as the robot. In addition, a movable imaging unit 160 may be provided in the head portion 1701 of the portable communication terminal 1700, and both the front and the rear of the portable communication terminal 1700 may be configured to be able to be imaged by one camera.

Figure 18:
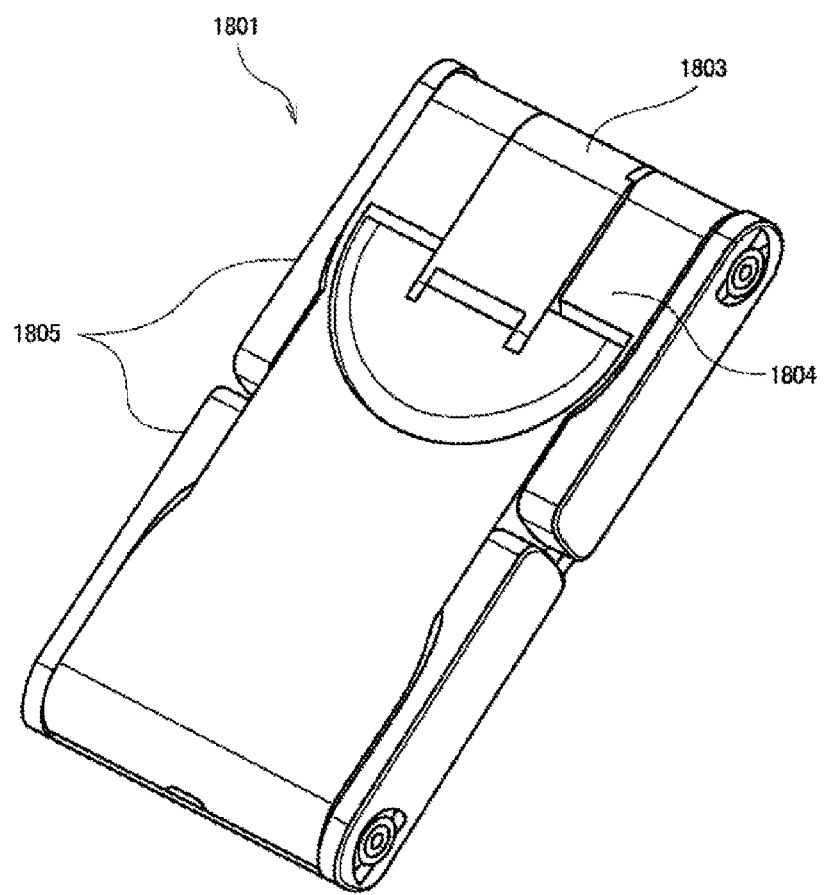
FIG. 18 is an outward appearance view illustrating another configuration Example 3 of the portable communication terminal.

FIG. 18 is a perspective view illustrating a third modified example of the portable communication terminal. In the example described above, although the leg portion 1803 and the two arm portions 1805 configure movable members, as illustrated in FIG. 18, the leg portion 1803 and four arm portions 1805 may configure movable members. By increasing the number of the arm portions 1805, the number of operation patterns of a portable communication terminal 1800 can be further increased. In addition, by configuring the four arm portions 1805, the portable communication terminal 1800 as a robot of a four-feet walking type can be provided as well.

In this way, the portable communication terminal according to each of the modified examples illustrated in FIGS. 16A to 18 becomes a portable communication terminal that can be expressed also as a robot while enjoying the advantages of the thin type.

(2) Although not particularly described in the examples described above, in operating the portable communication terminal 100 as a robot, an estimation function for estimating a user's feeling may be provided, and a response according to the estimated user's feeling may be configured to be performed.

That is, the control unit 170 of the portable communication terminal 100 may include a feeling estimating unit that estimates a feeling of a user from a face image of the user that is imaged by the imaging unit 160 and a tone, for example, of a voice of the user acquired from a microphone. The estimation of a feeling can be embodied using various technologies that are available conventionally. For example, the estimation may be embodied by estimation of a feeling using a learning model according to deep learning having a face image of a user as an input and outputting feeling information of the user.

Then, the portable communication terminal 100 generates an expression according to the estimated feeling, displays the expression on the display unit 140, and controls the arm portions 11 and 12 and the leg portion 13 to operate, whereby the portable communication terminal 100 operating as a robot capable of responding to a user can be provided.

(3) In Example 2 described above, in the method of generating an operation pattern, an example in which a user manually moves the arm portions 11 and 12 and the leg portion 13 of the portable communication terminal 100 has been described, but the method is not limited thereto. In this modified example, other methods of generating operation patterns will be described.

First, as one technique, there may be a technique in which a user generates an operation pattern on the portable communication terminal 100. As one example, patterns of behaviors that can be taken by the portable communication terminal 100 are displayed, for example, using icons on the display unit 140 of the portable communication terminal 100. Then, the user selects a behavior desired to be taken by the portable communication terminal 100 among the displayed icons and sets a behavior time and a behavior range of the behavior. By connecting this selection repeatedly, the control unit 170 of the portable communication terminal 100 generates an operation pattern by performing a simple programming and stores the generated operation pattern in the storage unit 120.

In addition, as another technique, an operation pattern is generated by performing an input using a voice for the portable communication terminal 100. In this configuration, the portable communication terminal 100 includes a microphone as the input unit 130. Then, the user performs an instruction such as "three steps go forward, rotate once, raise the right hand, lower the right hand, and one step backward" using a voice for the portable communication terminal 100. Speech recognition software and context analysis software are installed in the portable communication terminal 100, and details instructed by the user using the voice are analyzed. The analysis can be embodied using a known technology. Then, the control unit 170 generates an operation pattern for performing the operations of "three steps go forward, rotate once, raise the right hand, lower the right hand, and one step backward" in accordance with the analyzed details and stores the generated operation pattern in the storage unit 120. For example, this can be embodied using a learning model obtained by learning relations between instruction details of voices and operation patterns or can be embodied by storing a table in advance in which a text of a sentence that may be instructed using a voice and details of the operation in that case are associated with each other.

In addition, an operation pattern defining operations of the portable communication terminal 100 may be generated using hand-made programming by a programmer using an input device such as a keyboard by an information processing device such as another PC, for example. Such an operation pattern, for example, may be stored in the server illustrated in Example 2 described above, for example, and be configured to be able to be performed by the portable communication terminal 100 downloading and storing the operation pattern.

(4) In Example 2 described above, although an example in which an operation pattern is transmitted from the portable communication terminal 100 to another portable communication terminal 100, and the other portable communication terminal 100 receives and performs the operation pattern has been described, the configuration is not limited thereto. As described in Example 2 and Modified example (3) described above, the generated operation pattern may be stored in the storage unit 120 of its own portable communication terminal 100, be read at an optional timing (designation of a user or designation from an operation program), and be performed by the portable communication terminal 100 that has generated the operation pattern. That is, the portable communication terminal 100 may perform the operation pattern generated thereby.

(5) The program according to each example of this disclosure may be provided in a state in which it is stored on a computer-readable storage medium. As the storage medium, a program can be stored in a "non-transitory medium." The storage medium may include an appropriate optional storage medium such as an HDD or an SSD or an appropriate combination of such two or more media. The storage medium may be a volatile medium, a non-volatile medium, or a combination of a volatile medium and a non-volatile medium. In addition, the storage medium is not limited to such examples and may be any device or a medium as long as it can store a program.

In addition, the portable communication terminal 100, for example, reads a program stored in a storage medium and executes the read program, whereby the functions of a plurality of functional units illustrated in each example can be embodied. In addition, the program may be provided for the portable communication terminal 100 through an optional transmission medium (a communication network, a broadcast wave, for example). For example, by executing a program downloaded through the Internet, for example, the portable communication terminal 100 embodies the functions of a plurality of functional units illustrated in each example.

In addition, the program can be mounted, for example, using a script language such as ActionScript, or JavaScript (registered trademark), an object-oriented programming language such as Objective-C Java (registered trademark), a markup language such as HTML5, for example.

At least a part of the process of the portable communication terminal 100 may be embodied by cloud computing configured by one or more computers. In addition, each functional unit of the portable communication terminal 100 may be embodied by one or a plurality of circuits embodying the function illustrated in the example described above, or the functions of a plurality of functional units may be embodied by one circuit.

(6) Although the examples of this disclosure have been described on the basis of the drawings and the examples, it should be noted that various alterations and modifications can be easily performed by persons skilled in the art on the basis of the disclosure. Thus, such alterations and modifications belong to the scope of the disclosure. For example, functions included in each means, each step, for example, can be rearranged without any logical contradiction, and a plurality of means, steps, for example, can be combined as one or can be divided. In addition, configurations represented in the examples may be appropriately combined.

What is claimed is:

1. A thin portable communication terminal comprising:
a casing having a rectangular parallelepiped shape;
one pair of arm portions each having one end that is axially supported to be turnable with respect to corresponding one of both side faces on longer sides of the casing;
hand portions each disposed at another end of corresponding one of the one pair of arm portions; and
a leg portion disposed on one side face that is on a shorter side of the casing and is capable of independent movement;
further comprising a communication unit that communicates with other communication terminals; and
further comprising a drive control unit that controls independent travel using the leg portion, wherein the drive control unit controls the leg portion such that the leg portion approaches a user of the thin portable communication terminal when the communication unit accepts communication from another communication terminal.

2. The thin portable communication terminal according to claim 1, wherein the leg portion is configured to be positioned between the hand portions when the arm portions are located at overlapping positions with respect to the casing in a side view.

3. The thin portable communication terminal according to claim 1, wherein the arm portions are flat plate-shaped members running in parallel with side faces of the longer sides of the casing.

4. The thin portable communication terminal according to claim 1, wherein the arm portions have a width equal to or smaller than a thickness of the casing.

5. The thin portable communication terminal according to claim 1, further comprising rotation motors that turn rotation shafts that axially support the arm portions at the corresponding ends of the one pair of arm portions.

6. The thin portable communication terminal according to claim 1, wherein the hand portions are vehicle wheels connected to the corresponding other ends of the arm portions to be freely turnable.

7. The thin portable communication terminal according to claim 1, wherein the hand portions have a size equal to or smaller than a thickness of the casing in when the arm portions are located at overlapping positions with respect to the casing in a side view.

8. The thin portable communication terminal according to claim 1, wherein the leg portion includes a rotation shaft having a direction of the short side of the casing as its axial direction, a right wheel disposed at one end of the rotation shaft, a left wheel disposed at another end of the rotation shaft, a first running motor driving the right wheel, and a second running motor driving the left wheel.

9. The thin portable communication terminal according to claim 1, wherein the leg portion has a size equal to or smaller than a thickness of the casing in the side view.

10. The thin portable communication terminal according to claim 1, further comprising an image control unit that generates a face image of a character displayed on a display unit,
wherein the casing includes the display unit used to display an image.

11. The thin portable communication terminal according to claim 10,
wherein the thin portable communication terminal includes a storage unit storing a plurality of face images for the character, and
the image control unit generates a face image of the character by selecting one from among the plurality of face images.

12. The thin portable communication terminal according to claim 11, further comprising an imaging unit that images a selected vicinity,
wherein the storage unit stores image information representing the user, and
the drive control unit identifies a position of the user based on a captured image captured by the imaging unit and the image information and controls the leg portion such that the leg portion approaches the user.

13. The thin portable communication terminal according to claim 12, further comprising an imaging unit that images the selected vicinity,
wherein the storage unit stores image information representing the user, and
the drive control unit identifies a position of the user based on a captured image captured by the imaging unit and the image information and controls the leg portion to allow the imaging unit to continue to image the user.

14. The thin portable communication terminal according to claim 11,
wherein the storage unit further stores a drive pattern that drives the arm portions and the leg portion of the thin portable communication terminal, and
the drive control unit controls the arm portions and the leg portion in accordance with the drive pattern.

15. The thin portable communication terminal according to claim 14,
wherein the communication unit receives another drive pattern that drives the arm portions and the leg portion of the thin portable communication terminal, and
the drive control unit controls the arm portions and the leg portion in accordance with the other drive pattern.

16. The thin portable communication terminal according to claim 14,
wherein the drive control unit includes an acquisition unit that acquires inputs from a user for the arm portions and the leg portion and a generation unit that generates a drive pattern embodying the inputs acquired by the acquisition unit, and
the communication unit transmits the drive pattern generated by the generation unit to an external device.

17. The thin portable communication terminal according to claim 1, wherein when the arm portions are located at a position overlapping the casing, the thin portable communication terminal is configured to have a flat plate shape.

18. A method of controlling a thin portable communication terminal including:
a casing having a rectangular parallelepiped shape;
one pair of arm portions each having one end that is axially supported to be freely turnable with respect to both corresponding one of side faces on long sides of the casing;
hand portions each disposed at another end of corresponding one of the one pair of arm portions;
a leg portion that is disposed on one side face that is on a short side of the casing and is capable of independent movement;
a communication unit that is used for communicating with other communication terminals;
a drive control unit that is used for controlling independent travel using the leg portion;
and an imaging unit that is used for imaging the vicinity, the method comprising:
a receiving step of receiving communication from another communication terminal using the communication unit;
an imaging step of imaging the vicinity using the imaging unit; and
a control step of receiving reception of communication from the other communication terminal in the receiving step and controlling the leg portion such that the leg portion approaches a user of the thin portable communication terminal on the basis of a captured image captured in the imaging step using the drive control unit.

19. A control program for a thin portable communication terminal causing a computer of the thin portable communication terminal including:
a casing having a rectangular parallelepiped shape;
one pair of arm portions each having one end that is axially supported to be freely turnable with respect to corresponding one of both side faces on long sides of the casing;
hand portions each disposed at another end of corresponding one of the one pair of arm portions;
a leg portion that is disposed on one side face that is on a short side of the casing and is capable of independent movement; a communication unit that is used for communicating with other communication terminals;
a drive control unit that is used for controlling independent travel using the leg portion;
and an imaging unit that is used for imaging the vicinity, to embody:
a receiving function of receiving communication from another communication terminal using the communication unit;
an imaging function of imaging the vicinity using the imaging unit; and a control function of receiving reception of communication from the other communication terminal using the receiving function and controlling the leg portion such that the leg portion approaches a user of the thin portable communication terminal on the basis of a captured image captured using the imaging function using the drive control unit.

* * * * *